(12) United States Patent
del Castillo et al.

(10) Patent No.: US 8,838,403 B2
(45) Date of Patent: Sep. 16, 2014

(54) METHOD AND SYSTEM FOR A SELF-CALIBRATED MULTI-MAGNETOMETER PLATFORM

(75) Inventors: Manuel del Castillo, Madrid (ES); Steve Malkos, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 661 days.

(21) Appl. No.: 13/053,126

(22) Filed: Mar. 21, 2011

(65) Prior Publication Data

US 2012/0245875 A1 Sep. 27, 2012

(51) Int. Cl.
*G01C 17/38* (2006.01)
(52) U.S. Cl.
CPC ..................................... *G01C 17/38* (2013.01)
USPC ......................................................... 702/92
(58) Field of Classification Search
None
See application file for complete search history.

(56) References Cited

U.S. PATENT DOCUMENTS

2013/0245984 A1* 9/2013 Sheng ............................. 702/94

OTHER PUBLICATIONS

Renaudin et al., New Method for Magnetometers Based on Orientation Estimation, IEE/ION Plans 2010, May 4-6, 2010, p. 1-9.*

* cited by examiner

*Primary Examiner* — Aditya Bhat
(74) *Attorney, Agent, or Firm* — Sterne, Kessler, Goldstein & Fox P.L.L.C.

(57) ABSTRACT

A multi-magnetometer device comprises at least two z-axis aligned and physically rotated magnetometer triads utilized for measuring corresponding earth's magnetic field. The magnetic field measurements are utilized to measure rotation measurements of a single orthogonal axis along the 360 degrees of the complete circle without user's assistance and/or magnetometer movement for magnetometer calibration. The multi-magnetometer device may compute its magnetic heading utilizing the magnetic field measurements if no magnetic perturbations are detected. When magnetic perturbations are detected, a perturbation mitigation process may be performed. The rotation measurements may be generated by selectively combining the magnetic field measurements. Hard-iron components are determined utilizing the rotation measurements, and are removed from the magnetic field measurements. Soft-iron components are determined utilizing the hard-iron free magnetic field measurements, and are removed from the hard-iron free magnetic field measurements. The resulting perturbation free magnetic field measurements are utilized to compute magnetic heading.

20 Claims, 5 Drawing Sheets

METHOD AND SYSTEM FOR A SELF-CALIBRATED MULTI-MAGNETOMETER PLATFORM

CROSS-REFERENCE TO RELATED APPLICATIONS/INCORPORATION BY REFERENCE

None.

FIELD OF THE INVENTION

Certain embodiments of the invention relate to communication systems. More specifically, certain embodiments of the invention relate to a method and system for a self-calibrated multi-magnetometer platform.

BACKGROUND OF THE INVENTION

Magnetometers are instruments used for measuring the strength and direction of various magnetic fields such as the earth's magnetic field. The earth's magnetic field may be utilized to determine, for example, heading of a moving vehicle or a pedestrian. The heading of a moving pedestrian, for example, is defined as the angle formed between the longitudinal axis of the pedestrian and magnetic north. Magnetometers come in many different forms. A magnetometer triad is a magnetometer that is able to measure all three orthogonal components of magnetic field. Readings of the Earth's magnetic field provided by magnetometer triads may be utilized to compute the heading of a vehicle or a pedestrian in motion. Magnetometers may work very well in clean magnetic environments like in the outdoors. However, they may be strongly influenced by magnetic perturbations produced by manmade infrastructure in the indoors, for example. These magnetic perturbations may affect headings derived from magnetic filed measurements of the magnetometers.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a self-calibrated multi-magnetometer platform, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a self-calibrated multi-magnetometer platform. In various embodiments of the invention, a multi-magnetometer device or platform comprises at least two magnetometer triads that are aligned along z axis in a XYZ coordinate system, and physically incrementally rotated in a xy-plane of the XYZ coordinate system. At least two of the physically rotated magnetometer triads may be utilized to measure the corresponding earth's magnetic field. Rotation measurements of a single orthogonal axis along the 360 degrees of the complete circle may be taken utilizing the magnetic field measurements from the physically rotated magnetometers without user's assistance and/or magnetometer movement. The physically rotated magnetometers may be automatically calibrated utilizing the rotation measurements. The multi-magnetometer device may combine the magnetic field measurements from the physically rotated magnetometers for magnetic perturbation detection. The combined magnetic field measurements may be utilized to compute the magnetic heading for the multi-magnetometer device if no magnetic perturbations are detected. Upon detection of magnetic perturbations, the multi-magnetometer device may automatically initiate a perturbation mitigation process on the magnetic field measurements. The rotation measurements may be generated by selectively combining the magnetic field measurements from the physically rotated magnetometers. The perturbation mitigation process may determine hard-iron components of the detected magnetic perturbations utilizing the rotation measurements. The determined hard-iron components may be removed from the magnetic field measurements from the physically rotated magnetometers to form hard-iron free magnetic field measurements, which may be utilized to determine soft-iron components of the detected magnetic perturbations. The multi-magnetometer device may remove the determined soft-iron components from the hard-iron free magnetic field measurements to form perturbation free magnetic field measurements. The perturbation free magnetic field measurements may be utilized to compute the magnetic heading for the multi-magnetometer device.

Figure 1:
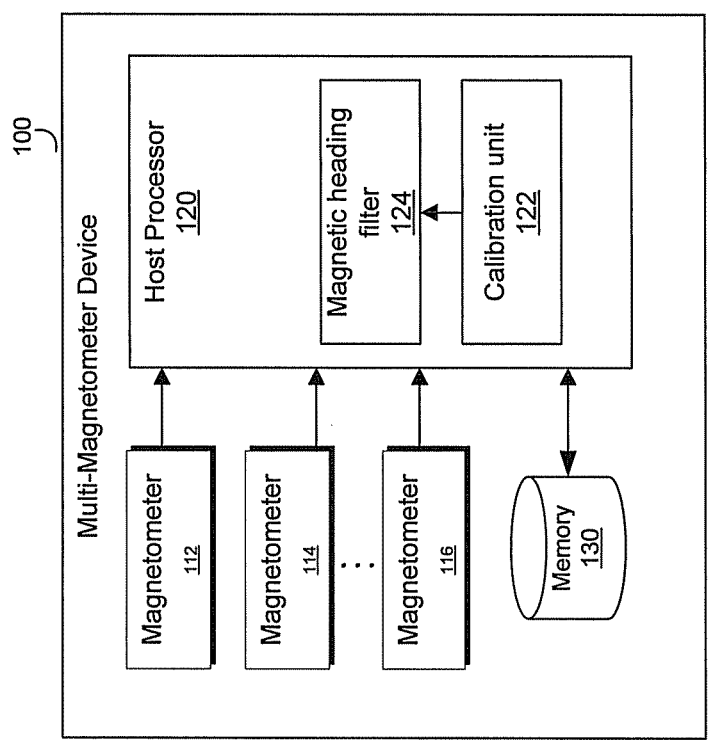
FIG. 1 is a diagram illustrating an exemplary multi-magnetometer device that is operable to self-calibrate magnetic field measurements without physically moving magnetometers of the multi-magnetometer device, in accordance with an embodiment of the invention.

FIG. 1 is a diagram illustrating an exemplary multi-magnetometer device that is operable to self-calibrate magnetic field measurements without physically moving magnetometers of the multi-magnetometer device, in accordance with an embodiment of the invention. Referring to FIG. 1, there is shown a multi-magnetometer device 100 comprising a host processor 110, a plurality of magnetometers 122-126 and a memory 130. The multi-magnetometer device 100 may be located in, for example, a hand-held device such as a cellphone or other wireless communication device such as a media player.

A magnetometer such as the magnetometer 112 may comprise suitable logic, circuitry and/or code that may be operable to measure the magnitude of various magnetic fields such as the earth's magnetic field. The magnetic field measurements are scalar measurements while the magnetic field itself is a vector. Depending on implementation, the magnetometer 112 may be mounted externally on the multi-magnetometer device 100, or may be integrated inside the multi-magnetometer device 100. The magnetometer 112 may provide the magnetic field measurements to the processor 120 in order to compute magnetic heading (also called magnetic azimuth) of the multi-magnetometer device 100. The magnetometer 112 may be implemented or configured in various ways. For example, the magnetometer 112 may utilize a tri-axis (triad) such as x, y, and z axis in a XYZ coordinate system to measure three orthogonal components of magnetic fields. The magnetometer 112 with a triad implementation is referred to a magnetometer triad. In an exemplary embodiment of the invention, the magnetometer triads 112-116 may be aligned along z-axis and may be physically rotated between one to another in a predetermined increment such as 30 degrees in xy-plane. In this regard, one magnetometer axis may be placed in the predetermined increment such as 30 degrees along the whole 360 degrees of azimuth. In an exemplary embodiment of the invention, the magnetic field measurements of the physically rotated magnetometer triads 112-116 may be utilized to simulate rotation measurements of a single magnetometer without assistance from user and/or without physically moving the single magnetometer.

The host processor 120 may comprise suitable logic, circuitry and/or code that may be operable to process signals received from the magnetometer triads 112-116. The received signals may comprise various magnetic field measurements such as the earth's magnetic field measurements. In an exemplary embodiment of the invention, in instances where the magnetometer triads 112-116 are aligned along z-axis, and are physically rotated between one to another in an increment such as 30-degrees in xy-plane, the host processor 120 may combine the magnetic field measurements from the physically rotated magnetometer triads 112-116 to perform magnetic perturbation detection. In this regard, the host processor 120 may be operable to compare the magnitudes of the combined magnetic field measurements with a perturbation threshold value. In instances where none of the magnitudes of the combined magnetic field measurements is greater than the perturbation threshold value, the host processor may determine that there are no magnetic perturbations. In instances where one or more of the magnitudes of the combined magnetic field measurements are greater than the perturbation threshold value, the host processor 120 may declare the detection of magnetic perturbations. In an exemplary embodiment of the invention, the host processor 120 may automatically signal or trigger the calibration unit 122 to start a perturbation mitigation process on the magnetic field measurements from the physically rotated magnetometer triads 112-116. Magnetic perturbation components of the detected magnetic perturbations may be removed from the magnetic field measurements through the perturbation mitigation process to provide perturbation-free magnetic field measurements. The host processor 120 may utilize the magnetic heading filter 124 to process the perturbation-free magnetic field measurements to compute or estimate magnetic heading (magnetic azimuth) for the multi-magnetometer device 100.

The calibration unit 122 may comprise suitable logic, circuitry and/or code that may be operable to perform an automatic perturbation mitigation process on the magnetic field measurements from the magnetometer triads 112-116. In various exemplary embodiments of the invention, the calibration unit 122 may utilize the magnetic field measurements from the physically rotated magnetometer triads 112-116 to simulate or form rotation measurements of a single orthogonal axis along the 360 degrees of the complete circle. In this regard, rotation measurements such as 30-degree rotation measurements of a single orthogonal axis along the 360 degrees of the complete circle may be simulated by selecting the magnetic field measurements taken, at different time instants, by the different physically rotated magnetometer triads 112-116. For example, the magnetic field measurement taken at a current time instant, $t_{current}$, by the physically rotated magnetometer triad 112, the magnetic field measurement taken at the time instant, $t_{current}+\Delta t$, $\Delta t>0$, by the physically rotated magnetometer triad 114, and the magnetic field measurement taken at the time instant, $t_{current}+2\Delta t$, by the physically rotated magnetometer triad 114, may be selected to simulate or form the rotation measurements at the time instants $t_{current}$, $t_{current}+\Delta t$, and $t_{current}+2\Delta t$ of a single orthogonal axis along the 360 degrees of the complete circle. In an exemplary embodiment of the invention, the calibration unit 122 may utilize the simulated rotation measurements to determine or compute hard-iron components of the detected magnetic perturbations. The calibration unit 122 may remove the determined hard-iron components from the combined magnetic field measurements to form hard-iron free magnetic field measurements. The calibration unit 122 may utilize the hard-iron free magnetic field measurements to determine or compute soft-iron components of the detected magnetic perturbations. The calibration unit 122 may remove the determined soft-iron components from the hard-iron free magnetic field measurements to form perturbation free magnetic field measurements. The calibration unit 122 may provide the perturbation free magnetic field to the magnetic heading filter 124.

The magnetic heading filter 124 may comprise suitable logic, circuitry and/or code that may be operable to compute or estimate the magnetic heading (magnetic azimuth) for the multi-magnetometer device 100. In this regard, in instances where no magnetic perturbations are detected, the magnetic heading filter 124 may utilize the magnetic field measurements directly from the physically rotated magnetometer triads 112-116 to compute or estimate the magnetic heading for the multi-magnetometer device 100. In instances where magnetic perturbations are detected, the magnetic heading filter 124 may utilize the perturbation free magnetic field measurements supplied from the calibration unit 122 to compute or estimate the magnetic heading for the multi-magnetometer device 100. Various algorithms such as Kalman filtering may be utilized by the magnetic heading filter 124 to compute or estimate the magnetic heading.

The memory 130 may comprise suitable logic, circuitry, interfaces and/or code that may be operable to store information such as executable instructions and data that may be utilized by the processor 120 and/or other associated component units such as, for example, the calibration unit 122 and the magnetic heading filter 124. The memory 130 may comprise RAM, ROM, low latency nonvolatile memory such as flash memory and/or other suitable electronic data storage.

In an exemplary operation, the multi-magnetometer device 100 may be operable to collect various magnetic field measurements such as earth's magnetic field measurements utilizing the magnetometers 112-116, which may be mounted on the multi-magnetometer device 100 or may be coupled inside the multi-magnetometer device 100. With regard to a XYZ coordinate system, the magnetometer triads 112-116 may be aligned along z-axis and may be physically rotated in xy-plane between one to another in 30 degrees increments, for example. The magnetic field measurements from the physically rotated magnetometer triads 112-116 may be utilized by the host processor 120 to compute the magnetic heading for the multi-magnetometer device 100. In this regard, the multi-magnetometer device 100 may be operable to combine the magnetic field measurements from the physically rotated magnetometers 112-116 to perform magnetic perturbation detection. The magnitudes of the combined magnetic field measurements may be utilized to detect magnetic perturbations. In instances where the magnetic perturbations are not detected, the magnetic field measurements from the physically rotated magnetometers 112-116 may be directly forwarded to the magnetic heading filter 124 so as to estimate or compute the magnetic heading for the multi-magnetometer device 100. In instances where the magnetic perturbations are detected, the calibration unit 122 may be automatically triggered to start a perturbation mitigation process on the magnetic field measurements from the physically rotated magnetometers 112-116. In this regard, the calibration unit 122 may select the magnetic field measurements from the physically rotated magnetometer triads 112-116 to simulate or form rotation measurements of a single orthogonal axis along the 360 degrees of the complete circle. The calibration unit 122 may utilize the simulated rotation measurements to determine hard-iron components of the detected magnetic perturbations. The calibration unit 122 may generate hard-iron free magnetic field measurements by removing the determined hard-iron components from the magnetic field measurements from the physically rotated magnetometers 112-116. Soft-iron components of the detected magnetic perturbations may be determined utilizing the hard-iron free magnetic field measurements. The calibration unit 122 may remove the determined soft-iron components from the hard-iron free magnetic field measurements. The calibration unit 122 may provide the resulting perturbation-free magnetic field measurements to the magnetic heading filter 124. The magnetic heading filter 124 may estimate the magnetic heading for the multi-magnetometer device 100 utilizing the perturbation-free magnetic field measurements.

Figure 2:
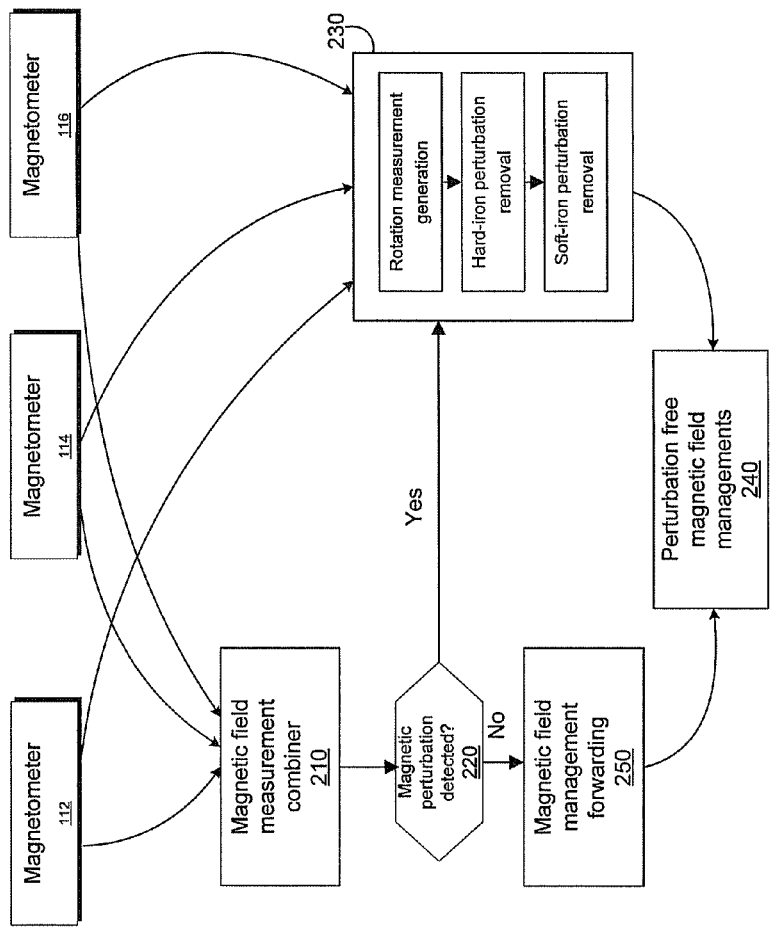
FIG. 2 is a diagram illustrating an exemplary signal flow implemented in a multi-magnetometer platform for self-calibrating magnetic field measurements without physically moving magnetometers of the multi-magnetometer device, in accordance with an embodiment of the invention.

FIG. 2 is a diagram illustrating an exemplary signal flow implemented in a multi-magnetometer platform for self-calibrating magnetic field measurements without physically moving magnetometers of the multi-magnetometer device, in accordance with an embodiment of the invention. Referring to FIG. 2, there is shown a signal flow 200 in a self-calibrated multi-magnetometer platform such as the multi-magnetometer device 100. The magnetometer triads 112-116 may be aligned along z-axis and may be physically rotated between one to another in a predetermined increment such as 30 degrees in xy-plane. The physically rotated magnetometer triads 112-116 may be utilized to measure the earth's magnetic field for the multi-magnetometer device 100. At least two of the physically rotated magnetometer triads 112-116 may be enabled or utilized to take the earth's magnetic field measurements for the multi-magnetometer device 100. A self-calibration process that may be utilized to calibrate the magnetic field measurements from the physically rotated magnetometer triads 112-116 may start in step 210, where the physically rotated magnetometer triads 112-116 may be utilized to provide corresponding earth's magnetic field measurements to the host processor 120. The host processor 120 may combine the received magnetic field measurements from the physically rotated magnetometer triads 112-116 to form combined magnetic field measurements for the multi-magnetometer device 100. In step 220, the host processor 120 may perform magnetic perturbation detection by comparing the magnitudes of the combined magnetic field measurements with a perturbation threshold value. Upon detection of magnetic perturbations, the host processor 120 may automatically trigger or signal the calibration unit 122 for a magnetic perturbation mitigation process. In step 230, the calibration unit 122 may utilize or execute perturbation mitigation software or application, for example, to start the calibration of the magnetic field measurements from the physically rotated magnetometer triads 112-116. In this regard, the calibration unit 122 may first generate the rotation measurements of a single orthogonal axis along the 360 degrees of the complete circle utilizing the magnetic field measurements from the physically rotated magnetometer triads 112-116. The calibration unit 122 may select all possible orthogonal pairs of individual axis of the physically rotated magnetometer triads 112-116 in order to cover the whole 360 degrees of azimuth. In this regard, the calibration unit 122 may select the magnetic field measurements taken, at different time instants, by the different physically rotated magnetometer triads 112-116 in order to simulate the rotation measurements of a single orthogonal axis along the 360 degrees of the complete circle. The calibration unit 122 may determine hard-iron components of the detected magnetic perturbations utilizing the simulated rotation measurements. The determined hard-iron components may be removed from the combined magnetic field measurements for the physically rotated magnetometer triads 112-116. The resulting hard-iron free magnetic field measurements may be utilized by the calibration unit 122 to determine soft-iron components of the detected magnetic perturbations. The calibration unit 122 may remove the determined soft-iron components from the hard-iron free magnetic, field measurements to form perturbation free or clean magnetic field measurements for the multi-magnetometer device 100. The calibration unit 122 may provide the perturbation-free magnetic field measurements to the magnetic heading filter 124. In step 240, the magnetic heading filter 124 may utilize the perturbation-free magnetic field measurements to compute or estimate the magnetic heading for the multi-magnetometer device 100.

In step 220, in instances where no magnetic perturbations are detected, the exemplary process may proceed in step 250, where the host processor 120 may directly forward the combined magnetic field measurements for the physically rotated magnetometer triads 112-116 to the magnetic heading filter 124. The exemplary process may proceed in step 240 to compute the magnetic heading for the multi-magnetometer device 100.

Figure 3:
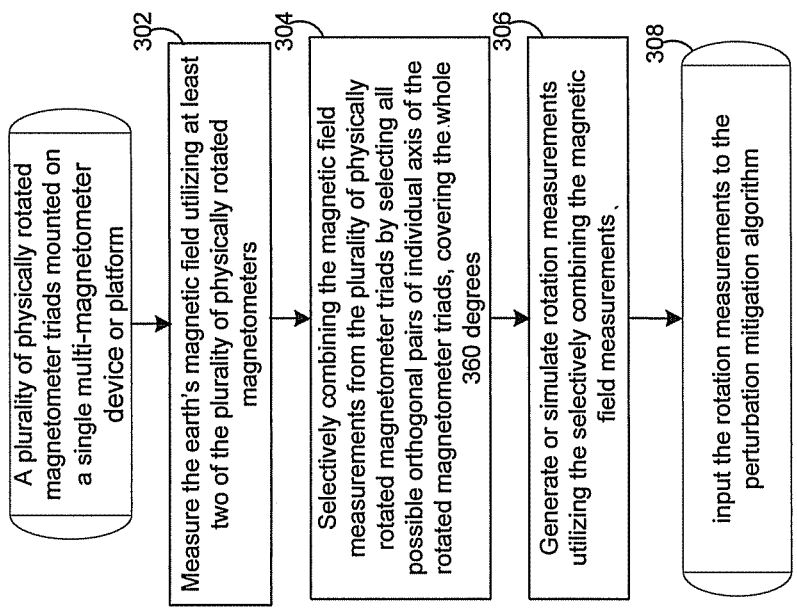
FIG. 3 is a block diagram illustrating exemplary steps that may be implemented in a multi-magnetometer platform to generate rotation measurements without user's assistance and/or magnetometer movement, in accordance with an embodiment of the invention.

FIG. 3 is a block diagram illustrating exemplary steps that may be implemented in a multi-magnetometer platform to generate rotation measurements without user's assistance and/or magnetometer movement, in accordance with an embodiment of the invention. Referring to FIG. 3, assuming that a plurality of magnetometer triads 112-116 are mounted on the single multi-magnetometer device 100. The magnetometer triads 112-116 may be aligned along z-axis and physically rotated in xy-plane between one to another in a determined increment such as 30-degrees, for example. In step 302, at least two of the plurality of physically rotated magnetometers 112-116 may be utilized to measure the earth's magnetic field. In step 304, the host processor 120 may selectively combining the magnetic field measurements from the plurality of physically rotated magnetometer triads 112-116 by selecting all possible orthogonal pairs of individual axis of the rotated magnetometer triads, covering the whole 360 degrees. In step 306, the host processor 120 may generate or simulate rotation measurements utilizing the selectively combining the magnetic field measurements. In step 308, the host processor 120 may input or provide the rotation measurements to the perturbation mitigation algorithm implemented in the calibration unit 122.

Figure 4:
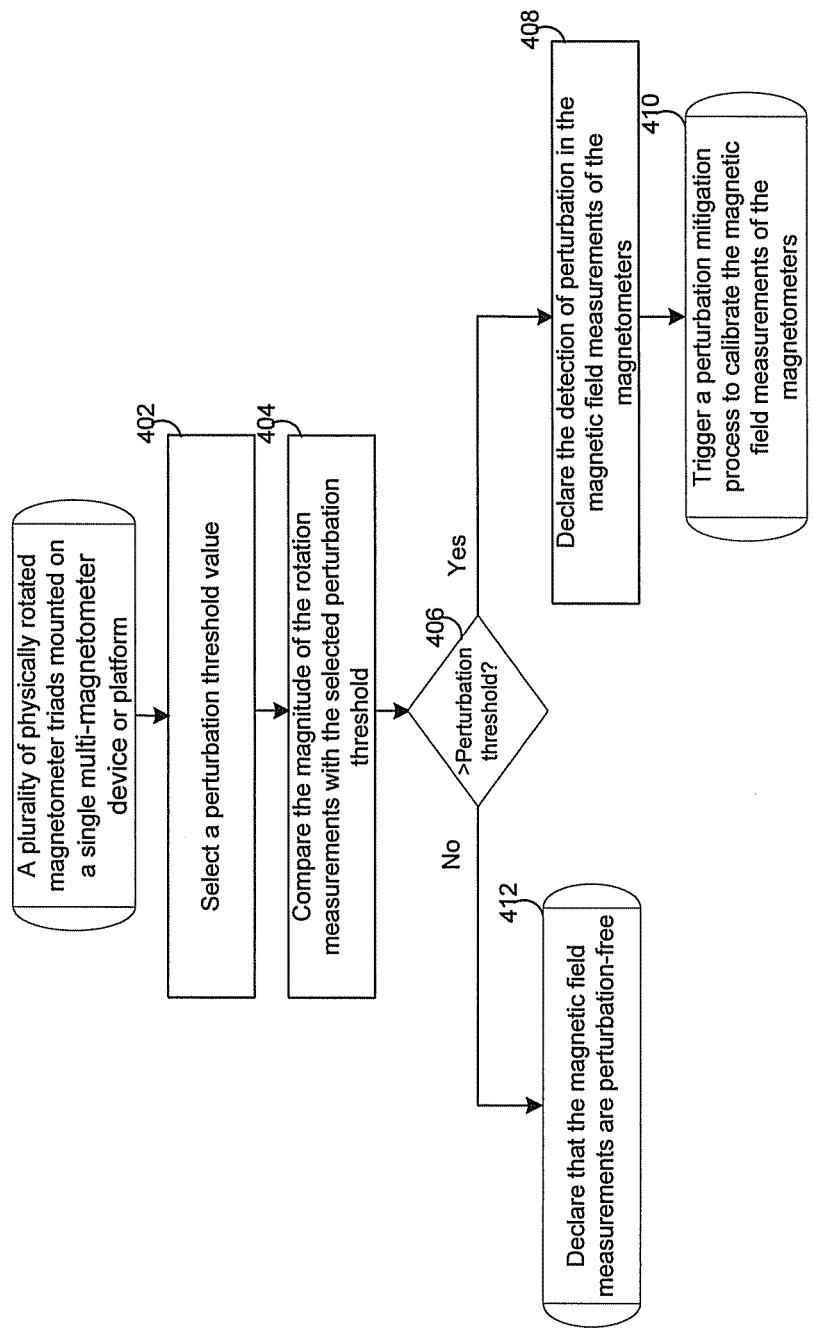
FIG. 4 is a block diagram illustrating exemplary steps that may be implemented in a multi-magnetometer platform to detect magnetic perturbations utilizing rotation measurements that are determined without user's assistance and/or magnetometer movement, in accordance with an embodiment of the invention.

FIG. 4 is a block diagram illustrating exemplary steps that may be implemented in a multi-magnetometer platform to detect magnetic perturbations utilizing rotation measurements that are determined without user's assistance and/or magnetometer movement, in accordance with an embodiment of the invention. Referring to FIG. 4, assuming that a plurality of magnetometer triads 112-116 are mounted on the single multi-magnetometer device 100. The magnetometer triads 112-116 may be aligned along z-axis and physically rotated in xy-plane between one to another in a determined increment such as 30-degrees, for example. At least two of the plurality of physically rotated magnetometers 112-116 may be utilized to measure the earth's magnetic field. In step 402, the host processor 120 may be operable to select or determine a perturbation threshold value for perturbation detection.

In step 404, the host processor 120 may be operable to compare the magnitudes of rotation measurements with the selected perturbation threshold value. The rotation measurements may be derived utilizing the magnetic filed measurements supplied from the at least two of the plurality of physically rotated magnetometers 112-116 without user's assistance and/or magnetometer movement. In step 406, in instances where one or more magnitudes of the rotation measurements are greater than the selected perturbation threshold value, then in step 408, the host processor 120 may declare that magnetic perturbations are detected with respect to the selected perturbation threshold value. In step 410, the host processor 120 may automatically trigger the calibration unit 122 to start a perturbation mitigation process to calibrate the magnetic field measurements from the at least two of the plurality of physically rotated magnetometers 112-116. In step 406, in instances where none of the magnitudes of the rotation measurements is greater than the selected perturbation threshold value, then in step 412, the host processor 120 may declare that the magnetic field measurements from the at least two of the plurality of physically rotated magnetometers 112-116 are perturbation free.

Figure 5:
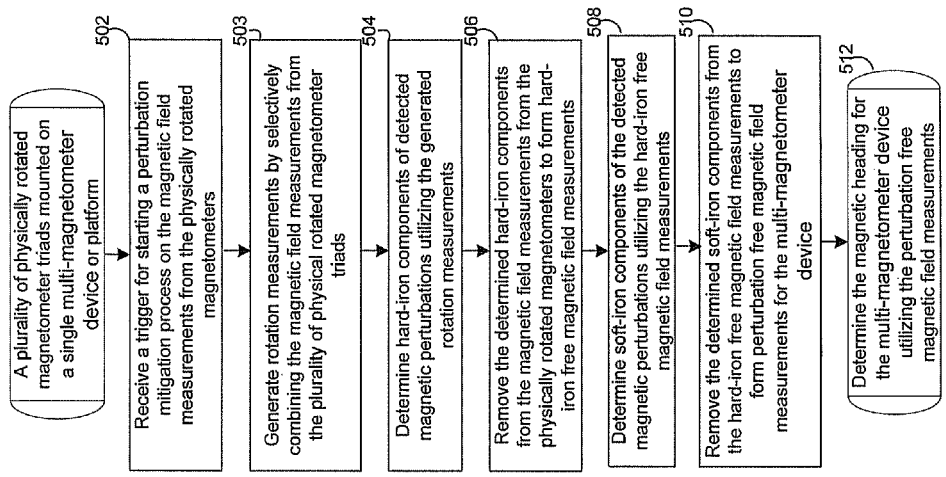
FIG. 5 is a block diagram illustrating exemplary steps that may be performed in a multi-magnetometer platform to automatically calibrate magnetic field measurements without user's assistance and/or magnetometer movement, in accordance with an embodiment of the invention.

FIG. 5 is a block diagram illustrating exemplary steps that may be performed in a multi-magnetometer platform to automatically calibrate magnetic field measurements without user's assistance and/or magnetometer movement, in accordance with an embodiment of the invention. Referring to FIG. 5, assuming that a plurality of magnetometer triads 112-116 are mounted on the single multi-magnetometer device 100. The magnetometer triads 112-116 may be aligned along z-axis and physically rotated in xy-plane between one to another in a determined increment such as 30-degrees, for example. At least two of the plurality of physically rotated magnetometers 112-116 may be utilized to measure the earth's magnetic field. In step 502, upon detection of magnetic perturbations, the calibration unit 122 may receive a trigger or may be signaled for starting a perturbation mitigation process on the magnetic field measurements from the physically rotated magnetometers 112-116. In step 503, the calibration unit 122 may generate or simulate rotation measurements of a single orthogonal axis along the 360 degrees of the complete circle by selectively combining the magnetic field measurements from the plurality of physical rotated magnetometer triads. For example, the calibration unit 122 may combine the magnetic field measurement taken at a current time instant, $t_{current}$, by the physically rotated magnetometer triad 112, the magnetic field measurement taken at the time instant, $t_{current}+\Delta t$, $\Delta t>0$, by the physically rotated magnetometer triad 114, and the magnetic field measurement taken at the time instant, $t_{current}+2\Delta t$, by the physically rotated magnetometer triad 114, may be selected to simulate or form the rotation measurements at the time instants $t_{current}$, $t_{current}+\Delta t$, and $t_{current}+2\Delta t$ of a single orthogonal axis along the 360 degrees of the complete circle. In step 504, the calibration unit 122 may be operable to determine hard-iron components of the detected magnetic perturbations utilizing rotation measurements. In step 506, the calibration unit 122 may remove the determined hard-iron components from the magnetic field measurements from the physically rotated magnetometers 112-116 to form hard-iron free magnetic field measurements. In step 508, the calibration unit 122 may be operable to determine soft-iron components of the detected magnetic perturbations utilizing the hard-iron free magnetic field measurements. In step 510, the calibration unit 122 may be operable to remove the determined soft-iron components from the hard-iron free magnetic field measurements to form perturbation free magnetic field measurements for the multi-magnetometer device 100. In step 512, the magnetic heading filter 124 may utilize the perturbation free magnetic field measurements to determine or estimate the magnetic heading for the multi-magnetometer device 100.

In various exemplary aspects of the method and system for a self-calibrated multi-magnetometer platform, a multi-magnetometer device such as the multi-magnetometer device 100 that comprises at least two magnetometers such as the magnetometer triads 112-116. The magnetometer triads 112-116 may be aligned, in a XYZ coordinate system, along z axis and may be physically rotated in a predetermined or dynamically changed increment such as 30-degrees in xy-plane. At least two of the physically rotated magnetometer triads 112-116 may be utilized to measuring corresponding earth's magnetic field. The host processor 120 may be operable to measure or form rotation measurements of a single orthogonal axis along the 360 degrees of the complete circle utilizing the corresponding magnetic field measurements collected by the physically rotated magnetometers 112-116 without user's assistance and/or magnetometer movement. The host processor 120 may be operable to calibrate the physically rotated magnetometer triads 112-116 utilizing the rotation measurements. In an embodiment of the invention, the host processor 120 may be operable to combine the magnetic field measurements from the physically rotated magnetometer triads 112-116 to form combined measurements for the multi-magnetometer device 100. Various algorithms such as, for example, a least-square combining, a maximal or maximum ratio combining (MRC) and/or an arithmetic average combining, may be utilized to combine the magnetic field measurements. The magnitudes of the combined measurements may be compared with a perturbation threshold so as to detect magnetic perturbations in the magnetic field measurements from the physically rotated magnetometer triads 112-116. In instances where one or more magnitudes of the combined measurements are not greater than the perturbation threshold value, the host processor 120 may declare that the magnetic field measurements are free of perturbation. The host processor 120 may directly forward the combined magnetic field measurements from the physically rotated magnetometer triads 112-116 to the magnetic heading filter 124 so as to compute the magnetic heading for the multi-magnetometer device 100. In instances where one or more magnitudes of the combined measurements are greater than the perturbation threshold value, the host processor 120 may declare the detection of the magnetic perturbations. In this regard, the host processor 120 may trigger or signal the calibration unit 122 to start a perturbation mitigation process on the magnetic field measurements from the physically rotated magnetometer triads 112-116. The calibration unit 122 may start the perturbation mitigation process by selectively combining the magnetic field measurements from the physically rotated magnetometer triads 112-116 to generate or simulate the rotation measurements. In this regard, the magnetic field measurements taken, at different time instants, by the different physically rotated magnetometer triads 112-116, may be selected to be combined to form the rotation measurements. For example, the magnetic field measurement taken at a current time instant, $t_{current}$, by the physically rotated magnetometer triad 112, the magnetic field measurement taken at the time instant, $t_{current}+\Delta t$, $\Delta t>0$, by the physically rotated magnetometer triad 114, and the magnetic field measurement taken at the time instant, $t_{current}+2\Delta t$, by the physically rotated magnetometer triad 114, may be selected to simulate or form the rotation measurements at the time instants $t_{current}$, $t_{current}+\Delta t$, and $t_{current}2\Delta t$ of a single orthogonal axis along the 360 degrees of the complete circle. The calibration unit 122 may determine hard-iron components of the detected magnetic perturbations utilizing the rotation measurements. The determined hard-iron components may be removed from the magnetic field measurements from the physically rotated magnetometer triads 112-116 to form hard-iron free magnetic field measurements. The host processor 120 may utilize the hard-iron free magnetic field measurements to determine soft-iron components of the detected magnetic perturbations. The determined soft-iron components may be removed from the hard-iron free magnetic field measurements to form perturbation free magnetic field measurements. The calibration unit 122 may provide the perturbation free magnetic field measurements to the magnetic heading filter 124 to compute the magnetic heading for the multi-magnetometer device 100.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a self-calibrated multi-magnetometer platform.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for removing a magnetic perturbation from magnetic field measurements in a multi-magnetometer device that comprises at least two magnetometers, said at least two magnetometers being aligned along an axis in a three dimensional coordinate system, the method comprising:
   incrementally rotating said at least two magnetometers in a plane of said three dimensional coordinate system;
   measuring a magnetic field along a complete circle around said axis in said three dimensional coordinate system while said at least two magnetometers are being incrementally rotated;
   incrementally combining said magnetic field measurements taken, at different time instants, by different magnetometers from among said at least two magnetometers to simulate a rotation of a single orthogonal axis along the complete circle around said axis in said three dimensional coordinate system;
   detecting said magnetic perturbation within said combined magnetic field measurements; and
   removing said magnetic perturbation from said combined magnetic field measurements when detected.

2. The method according to claim 1, wherein said detecting comprises:
   comparing said combined magnetic field measurements with a perturbation threshold value.

3. The method according to claim 2, wherein said comparing comprises:
   comparing magnitudes of said combined magnetic field measurements with said perturbation threshold value.

4. The method according to claim 1, further comprising:
   determining a magnetic heading for said multi-magnetometer device based upon said combined magnetic field measurements when said magnetic perturbation is not detected.

5. The method according to claim 1, wherein said removing comprises:
   determining a hard-iron component of said detected magnetic perturbation; and
   removing said determined hard-iron component from said combined magnetic field measurements to form hard-iron free magnetic field measurements.

6. The method according to claim 5, wherein said removing further comprises:
   determining a soft-iron component of said detected magnetic perturbation based upon said hard-iron free magnetic field measurements; and
   removing said determined soft-iron component from said hard-iron free magnetic field measurements to form perturbation free magnetic field measurements.

7. The method according to claim 6, further comprising:
computing a magnetic heading for said multi-magnetometer device utilizing said perturbation free magnetic field measurements.

8. The method according to claim 1, wherein said incrementally combining comprises:
combining a first magnetic field measurement from said magnetic field measurements taken, at a first time instant, by a first magnetometer from among said at least two magnetometers and a second magnetic field measurement from said magnetic field measurements taken, at a second time instant different from said first time instant, by a second magnetometer from among said at least two magnetometers.

9. The method according to claim 8, wherein said incrementally combining further comprises:
repeating said combining of said magnetic field measurements taken by said first magnetometer and said magnetic field measurement taken by said second magnetometer at said different time instants until said complete circle around said axis in said three dimensional coordinate system is simulated.

10. A multi-magnetometer device for removing a magnetic perturbation from magnetic field measurements, comprising:
at least two magnetometers, wherein said at least two magnetometers are configurable to be aligned along an axis in a three dimensional coordinate system and are configured to incrementally rotate in a plane of said three dimensional coordinate system around said axis in said three dimensional coordinate system to measure corresponding a magnetic field along a complete circle around said axis in said three dimensional coordinate system; and
a host processor configured:
to incrementally combine said magnetic field measurements taken, at different time instants, by different magnetometers from among said at least two magnetometers to simulate a rotation of a single orthogonal axis along said complete circle around said axis in said three dimensional coordinate system,
to detect said magnetic perturbation within said combined magnetic field measurements, and
to remove said magnetic perturbation from said combined magnetic field measurements when detected.

11. The multi-magnetometer device of claim 10, wherein said host processor is configured to compare said combined magnetic field measurements with a perturbation threshold value to detect whether said magnetic perturbation is present.

12. The multi-magnetometer device of claim 11, wherein said host processor is further configured to compare magnitudes of said combined magnetic field measurements with said perturbation threshold value.

13. The multi-magnetometer device of claim 10, wherein said host processor is further configured to determine a magnetic heading for said multi-magnetometer device based upon said combined magnetic field measurements when said magnetic perturbation is not detected.

14. The multi-magnetometer device of claim 10, wherein said host processor comprises:
a calibration unit, said host processor being further configured to trigger said calibration unit to remove said magnetic perturbation when said magnetic perturbation is detected.

15. The multi-magnetometer device of claim 10, wherein said host processor is further configured:
to determine a hard-iron component of said magnetic perturbation, and
to remove said determined hard-iron component from said combined magnetic field measurements to form hard-iron free magnetic field measurements.

16. The multi-magnetometer device of claim 15, wherein said host processor is further configured:
to determine a soft-iron component of said detected magnetic perturbation based upon said hard-iron free magnetic field measurements, and
to remove said determined soft-iron component from said hard-iron free magnetic field measurements to form perturbation free magnetic field measurements.

17. The multi-magnetometer device of claim 16, wherein said host processor is further configured:
to compute a magnetic heading for said multi-magnetometer device based upon said perturbation free magnetic field measurements.

18. The multi-magnetometer device of claim 10, wherein said at least two magnetometers are configurable to be aligned along a z axis in an XYZ coordinate system, and are configured to incrementally rotate in an xy-plane of said XYZ coordinate system around said z axis in said XYZ coordinate system.

19. The multi-magnetometer device of claim 10, wherein said host processor is further configured to combine a first magnetic field measurement from said magnetic field measurements taken, at a first time instant, by a first magnetometer from among said at least two magnetometers and a second magnetic field measurement from said magnetic field measurements taken, at a second time instant different from said first time instant, by a second magnetometer from among said at least two magnetometers.

20. The multi-magnetometer device of claim 19, wherein said host processor is further configured to continue combining said magnetic field measurements taken by said first magnetometer and said magnetic field measurements taken by said second magnetometer at said different time instants until said complete circle around said axis in said three dimensional coordinate system is simulated.

* * * * *